US012592490B2

(12) United States Patent
Jin et al.

(10) Patent No.: US 12,592,490 B2

(45) Date of Patent: Mar. 31, 2026

(54) ANTENNA AND ELECTRONIC DEVICE

(71) Applicants: Beijing BOE Sensor Technology Co., Ltd., Beijing (CN); BOE Technology Group Co., Ltd., Beijing (CN)

(72) Inventors: Yunnan Jin, Beijing (CN); Liang Guo, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 52 days.

(21) Appl. No.: 18/631,803

(22) Filed: Apr. 10, 2024

(65) Prior Publication Data

US 2024/0364014 A1 Oct. 31, 2024

Related U.S. Application Data

(63) Continuation of application No. PCT/CN2023/091439, filed on Apr. 28, 2023.

(51) Int. Cl.

*H01Q 9/04* (2006.01)
*H01Q 21/08* (2006.01)

(52) U.S. Cl.

CPC ........... *H01Q 9/0485* (2013.01); *H01Q 21/08* (2013.01)

(58) Field of Classification Search

None

See application file for complete search history.

(56) References Cited

U.S. PATENT DOCUMENTS 10,673,135 B2 * 6/2020 Yu ............................ H01Q 3/24
2022/0368031 A1 * 11/2022 Gouchi ................ H01Q 1/2283

FOREIGN PATENT DOCUMENTS

| | | | |
|---|---|---|---|
| CN | 200953381 | Y | 9/2007 |
| CN | 209329168 | U | 8/2019 |
| CN | 111063997 | A | 4/2020 |
| CN | 114914678 | A | 8/2022 |
| CN | 115775972 | A | 3/2023 |
| WO | 2020134471 | A1 | 7/2020 |
| WO | 2022246814 | A1 | 12/2022 |

OTHER PUBLICATIONS

PCT/CN2023/091439 international search report dated Jan. 18, 2024.

* cited by examiner

*Primary Examiner* — Crystal L Hammond

(74) *Attorney, Agent, or Firm* — IPro, PLLC

(57) ABSTRACT

Provided is an antenna. The antenna includes: a first substrate, wherein the first substrate includes: a first dielectric substrate, including a main substrate and a side substrate, wherein the main substrate is provided with a first surface and a second surface, and the side substrate is provided with a third surface and a fourth surface; a first reference electrode layer, disposed on the first surface and the fourth surface; at least one support assembly, disposed on the second substrate; at least one radiation structure, disposed on a side of the support assembly; and at least one first feeder set, configured to feed one of the at least one radiation structure, wherein each of the at least one first feeder set includes a first feeder and a second feeder.

19 Claims, 9 Drawing Sheets

ANTENNA AND ELECTRONIC DEVICE

CROSS-REFERENCE TO RELATED APPLICATION

This application is a continuation application of international application No. PCT/CN2023/091439, filed on Apr. 28, 2023, the disclosure of which is herein incorporated by reference in its entirety.

TECHNICAL FIELD

The present disclosure relates to the field of communication technologies, in particular to an antenna and an electronic device.

BACKGROUND

Transparent antennas, as a new type of beautifying antennas, are gradually used in special application scenarios, such as on-board communication, large-angle building signal coverage and the like due to excellent concealment and radiation performance not inferior to traditional antennas.

SUMMARY

Some embodiments of the present disclosure provide an antenna. The antenna includes: a first substrate, wherein the first substrate includes:

a first dielectric substrate, including a main substrate and a side substrate, wherein the main substrate is provided with a first surface and a second surface that are opposite to each other in a thickness direction of the main substrate, and the side substrate is provided with a third surface and a fourth surface that are opposite to each other in a thickness direction of the side substrate, the second surface of the main substrate being connected to the third surface of the side substrate, and the side substrate protruding from the second surface of the main substrate;

a first reference electrode layer, disposed on the first surface and the fourth surface;

at least one support assembly, disposed on the second surface;

at least one radiation structure, disposed on a side, facing away from the main substrate, of the support assembly; and at least one first feeder set, configured to feed one of the at least one radiation structure, wherein each of the at least one first feeder set includes a first feeder and a second feeder, wherein the first feeder and the second feeder extend to the at least one support assembly through the second surface and are electrically connected to the at least one radiation structure, and polarization directions of the first feeder and the second feeder are different.

In some embodiments, the first substrate further includes:

a first feed structure, disposed on the third surface, wherein a first feed port of the first feed structure is electrically connected to the first feeder; and the antenna further includes a second substrate, wherein the second substrate includes:

a second dielectric substrate, provided with a fifth surface and a sixth surface that are opposite to each other in a thickness direction of the second dielectric substrate, wherein the fifth surface and the fourth surface are oppositely disposed;

a second reference electrode layer, disposed on the fifth surface; and a second feed structure, disposed on the sixth surface, wherein a first feed port of the second feed structure is electrically connected to the second feeder through a first connection via, wherein the first connection via extends through the side substrate, the first reference electrode layer, the second reference electrode layer, and the second dielectric substrate.

In some embodiments, a first opening is defined in the second reference electrode layer, wherein a first connection electrode is disposed in the first opening; and the antenna further includes a first radiation frequency line and a second radiation frequency line; wherein a line core of the first radiation frequency line is electrically connected to a second feed port of the first feed structure through a second connection via, wherein the second connection via extends through the second dielectric substrate, the second reference electrode layer, the first reference electrode layer, and the side substrate; and a line core of the second radiation frequency line is electrically connected to the first connection electrode through a third connection via, wherein the first connection electrode is electrically connected to a second feed port of the second feed structure through a fourth connection via, the third connection via and the fourth connection via extending through the second dielectric substrate.

In some embodiments, the antenna further includes: a second opening, wherein the second opening extends through the side substrate and the first reference electrode layer, and the line core of the second radiation frequency line extends through the second opening.

In some embodiments, the antenna further includes: a first pad and a second pad, wherein the first pad is sleeved on the first radiation frequency line, is electrically connected to a reference position of the first radiation frequency line, and is electrically connected to the second reference electrode layer through a fifth connection via; and the second pad is sleeved on the second radiation frequency line, is electrically connected to a reference position of the second radiation frequency line, and is electrically connected to the second reference electrode layer through a sixth connection via, the fifth connection via and the sixth connection via extending through the second dielectric substrate.

In some embodiments, the second dielectric substrate is a printed circuit board.

In some embodiments, the first feeder includes a first main circuit, a first branch circuit, and a second branch circuit, and the second feeder includes a second main circuit, a third branch circuit, and a fourth branch circuit; wherein for the first feeder, one end of the first main circuit is electrically connected to a first feed port of the first feed structure, the other end of the first main circuit is electrically connected to the first branch circuit and the second branch circuit, and the first branch circuit and the second branch circuit are electrically connected to one of the at least one radiation structure; and for the second feeder, one end of the second main circuit is electrically connected to a first feed port of the second feed structure, the other end of the second main circuit is electrically connected to the third branch circuit and the fourth branch circuit, and the third branch circuit and the fourth branch circuit are electrically connected to one of the at least one radiation structure.

In some embodiments, each of the at least one support assembly includes a first support portion, a second support portion, a third support portion, and a fourth support portion that are disposed on the main substrate; wherein a first laser engraved pattern is formed on the first support portion, a second laser engraved pattern is formed on the second support portion, a third laser engraved pattern is formed on the third support portion, and a fourth laser engraved pattern is formed on the fourth support portion; wherein the first branch circuit is formed on the first laser engraved pattern, the second branch circuit is formed on the second laser engraved pattern, the third branch circuit is formed on the third laser engraved pattern, and the fourth branch circuit is formed on the fourth laser engraved pattern.

In some embodiments, the first support portion, the second support portion, the third support portion, and the fourth support portion are all made of polycarbonate plastics or cycloolefin polymer plastics.

In some embodiments, each of orthographic projections of the first support portion, the second support portion, the third support portion, and the fourth support portion on the main substrate is T-shaped, and each of the first support portion, the second support portion, the third support portion, and the fourth support portion includes a first portion and a second portion that are disposed on the main substrate and connected with each other, wherein the first laser engraved pattern is formed on the first portion of the first support portion, the second laser engraved pattern is formed on the first portion of the second support portion, the third laser engraved pattern is formed on the first portion of the third support portion, and the fourth laser engraved pattern is formed on the first portion of the fourth support portion.

In some embodiments, protrusion portions are provided on sides, facing away from the first dielectric substrate, of the second portion of the first support portion, the second portion of the second support portion, the second portion of the third support portion, and the second portion of the fourth support portion, wherein the protrusion portions extend through the at least one radiation structure and are secured to the at least one radiation structure.

In some embodiments, each of the at least one radiation structure includes a third dielectric substrate opposite to the main substrate and a radiation layer disposed on the third dielectric substrate.

In some embodiments, the radiation layer is disposed on a side, proximal to the main substrate, of the third dielectric substrate.

In some embodiments, the radiation layer is of a metal mesh structure.

In some embodiments, a line width of the metal mesh structure ranges from 2 μm to 30 μm, a line space of the metal mesh structure ranges from 50 μm to 250 μm, and a line thickness of the metal mesh structure ranges from 1 μm to 10 μm.

In some embodiments, the third dielectric substrate is made of any of a polycarbonate plastic, a cycloolefin polymer plastic, and organic glass.

In some embodiments, the antenna further includes: an antenna housing, wherein the first substrate is disposed in the antenna housing.

In some embodiments, the first dielectric substrate is made of any of a polycarbonate plastic, a cycloolefin polymer plastic, and organic glass.

In some embodiments, the main substrate and the side substrate are of an integrated structure.

Some embodiments of the present disclosure further provide an electronic device. The electronic device includes the antenna in any of the above embodiments.

BRIEF DESCRIPTION OF DRA WINGS

DETAILED DESCRIPTION

Figure 1:
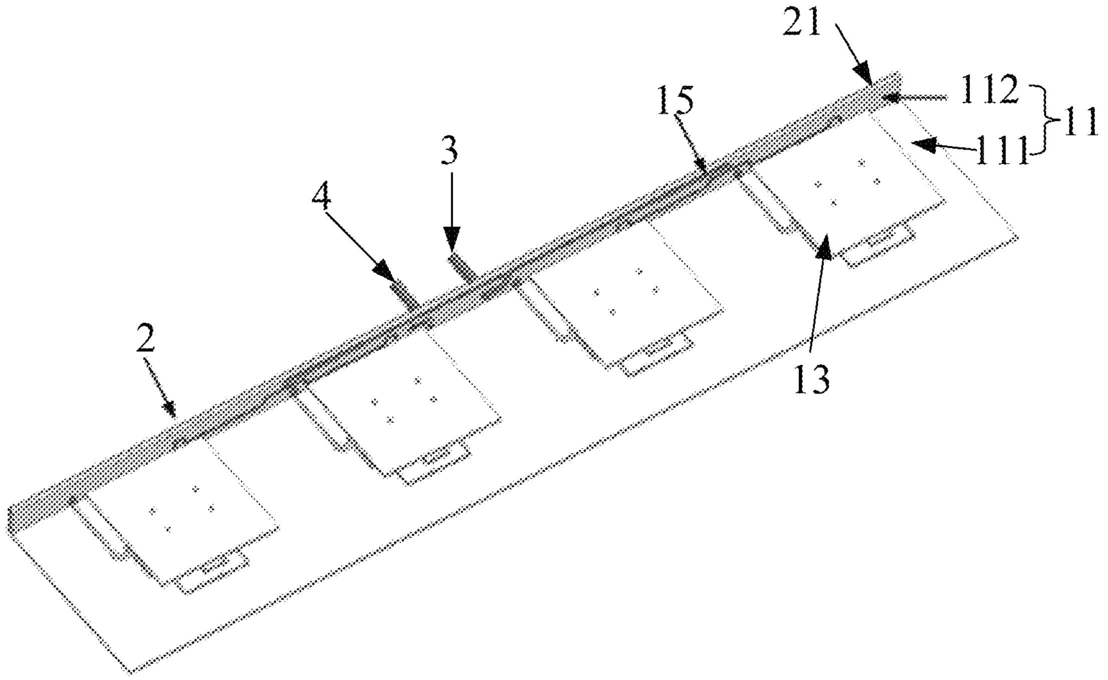
FIG. 1 is a full view of an antenna according to some embodiments of the present disclosure.

For clearer descriptions of the objects, technical solutions, and advantages of the embodiments of present disclosure, the present disclosure is described in detail hereinafter in combination with the accompanying drawings and the specific embodiments of the present disclosure.

Unless otherwise defined, technical or scientific terms used in the present disclosure shall have ordinary meaning understood by persons of ordinary skill in the art to which the disclosure belongs. The terms “first,” “second,” and the like used in the embodiments of the present disclosure are not intended to indicate any order, quantity or importance, but are merely used to distinguish the different components.

The terms "a," "an," and the like are not intended to limit the quantity, and only represent that at least one exists. The terms "comprise" or "include" and the like are used to indicate that the element or object preceding the terms covers the element or object following the terms and its equivalents, and shall not be understood as excluding other elements or objects. The terms "connect" or "contact" and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

At present, the most common method for manufacturing the transparent antenna is a process that an antenna radiation element is achieved by adhering a transparent conducting thin film formed by a metal mesh process on a surface of a smooth transparent structural member by an optically clear adhesive (OCA) with an excellent transparency. As the common transparent antenna requires the adhering process of the transparent conducting thin film, implementations of the antenna are generally limited to a single layer or laminated patch form, and the form of the antenna greatly limits an operating bandwidth achievable by the antenna.

In a first aspect, as shown in FIGS. 1 to 11, the embodiments of the present disclosure provide an antenna. The antenna at least includes a first substrate. The first substrate includes a first dielectric substrate 11, a first reference electrode layer 16, at least one support assembly 17, at least one radiation structure 13, and at least one feeder set. In the embodiments of the present disclosure, the feeder set and the support assembly 17 are in one-to-one correspondence to the radiation structure 13. The embodiments of the present disclosure are described by taking four feeder sets, four support assemblies 17 and four radiation structures 13 as an example, which are not constructed as the limitation of the embodiments of the present disclosure. One radiation structure 13 and the connected feeder set form an oscillator, that is, the antenna includes four oscillators.

Specifically, the first dielectric substrate 11 in the first substrate includes a main substrate 111 and a side substrate 112. The main substrate 111 is provided with a first surface M1 and a second surface M2 that are opposite to each other in a thickness direction of the main substrate 111, and the side substrate 112 is provided with a third surface M3 and a fourth surface M4 that are opposite to each other in a thickness direction of the side substrate 112. The second surface M2 of the main substrate 111 is connected to the third surface M3 of the side substrate 112, and the side substrate 112 protrudes from the second surface M2 of the main substrate 111. That is, the first dielectric substrate 11 is a L-shaped substrate. The first reference electrode layer 16 is disposed on the first surface M1 of the main substrate 111 and the fourth surface M4 of the side substrate 112. The support assembly 17 is disposed on the second surface M2 of the main substrate 111. The radiation structure 13 is disposed on a side, facing away from the main substrate 111, of the support assembly 17. Each feeder set includes two feeders, that is, a first feeder 141 and a second feeder 142. The first feeder 141 and the second feeder 142 in the feeder set extend to the support assembly 17 through the second surface M2 and are electrically connected to the radiation structure 13. In the embodiments of the present disclosure, polarization directions of the first feeder 141 and the second feeder 142 are different, that is, a double-polarized antenna is achieved. It should be noted that, with reference to FIG. 7, the first feeder 141 and the second feeder 142 in the feeder set in the embodiments of the present disclosure are one-two power dividers. The first feeder 141 includes a first main circuit 141*a*, a first branch circuit 141*b*, and a second branch circuit 141*c*. The second feeder 142 includes a second main circuit 142*a*, a third branch circuit 142*b*, and a fourth branch circuit 142*c*. The first main circuit 141*a* is electrically connected to a first feed structure 15, and the second main circuit 142*a* is electrically connected to a second feed structure 22. The first main circuit 141*a* is electrically connected to the first branch circuit 141*b* and the second branch circuit 141*c*, and the first branch circuit 141*b* and the second branch circuit 141*c* extend to the support assembly 17 to be electrically connected to the radiation structure 13. The second main circuit 142*a* is electrically connected to the third branch circuit 142*b* and the fourth branch circuit 142*c*, and the third branch circuit 142*b* and the fourth branch circuit 142*c* extend to the support assembly 17 to be electrically connected to the radiation structure 13. A phase difference between the first branch circuit 141*b* and the second branch circuit 141*c* is 180° (the point A and the point B in the drawing), and a phase difference between the third branch circuit 142*b* and the fourth branch circuit 142*c* is 180°. In this case, the ±45° polarization is achieved in the embodiments of the present disclosure. The embodiments of the present disclosure are only described by taking ±45° as an example, and it can be understood that other polarization directions are also achievable in the antenna in the embodiments of the present disclosure, which are not illustrated herein.

In the embodiments of the present disclosure, the first feeder 141 and the second feeder 142 are disposed on the support assembly 17, and the lines originally disposed in a horizontal plane are changed to lines designed vertically, such that the transmittance of the antenna is improved, the freedom of antenna design is enhanced, and the large bandwidth and high isolation of the antenna are achieved.

In some embodiments of the present disclosure, the antenna not only includes the above structure, but also includes a first feed structure 15 and a second feed structure 22. The first feed structure 15 is configured to feed to the first feeders 141 in the feeder sets, and the second feed structure 22 is configured to feed to the second feeders 142 in the feeder sets.

Figure 2:
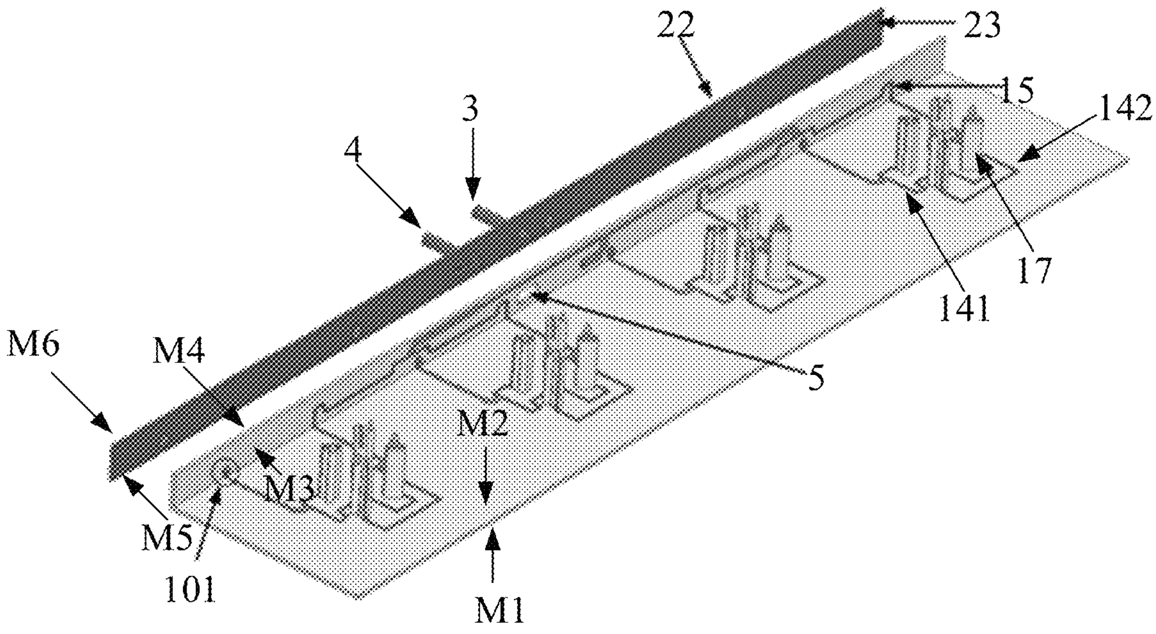
FIG. 2 is a schematic separation diagram of a first substrate and a second substrate at a first view according to some embodiments of the present disclosure.
Figure 3:
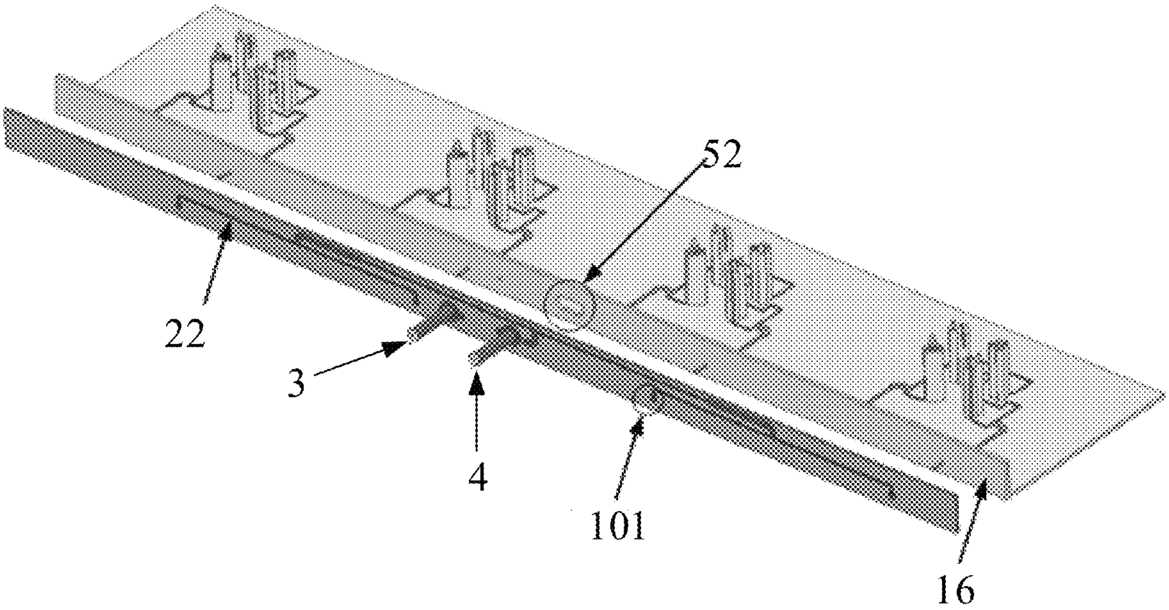
FIG. 3 is a schematic separation diagram of a first substrate and a second substrate at a second view according to some embodiments of the present disclosure.

In some embodiments, as shown in FIG. 2, the first feed structure 15 is integrated in the first substrate, and the second feed structure 22 is integrated in the second substrate 2. Specifically, the first feed structure 15 is disposed on the third surface M3 of the side substrate 112. As the antenna includes four radiation structures 13, the first feed structure 15 uses a one-four power divider, that is, is provided with one second feed port and four first feed ports. In this case, the second feed port of the first feed structure 15 is connected to the corresponding first feeder 141 (the first main circuit 141*a*). As shown in FIG. 3, the second substrate 2 includes a second dielectric substrate 21, a second reference electrode layer 23, and a second feed structure 22. The second dielectric substrate 21 is provided with a fifth surface M5 and a sixth surface M6 that are opposite to each other, the second reference electrode layer 23 of the second dielectric substrate 21 is disposed on the fifth surface M5 and is opposite to the fourth surface M4 of the side substrate 112. The second feed structure 22 is disposed on the sixth surface M6 of the second dielectric substrate 21, and also uses a one-four power divider, that is, is provided with one second feed port and four first feed ports. In this case, the second feed port of the second feed structure 22 is connected to the corresponding second feeder 142 (the first main circuit 141*a*) via a first connection via 101. The first connection via 101 extends through the side substrate 112, the first reference electrode layer 16, the second reference electrode layer 23, and the second dielectric substrate 21.

Furthermore, the antenna further includes a first radiation frequency line 3 and a second radiation frequency line 4. A line core of the first radiation frequency line 3 is electrically connected to the second feed port of the first feed structure 15, and a line core of the second radiation frequency line 4 is electrically connected to the second feed port of the second feed structure 22.

Figure 4:
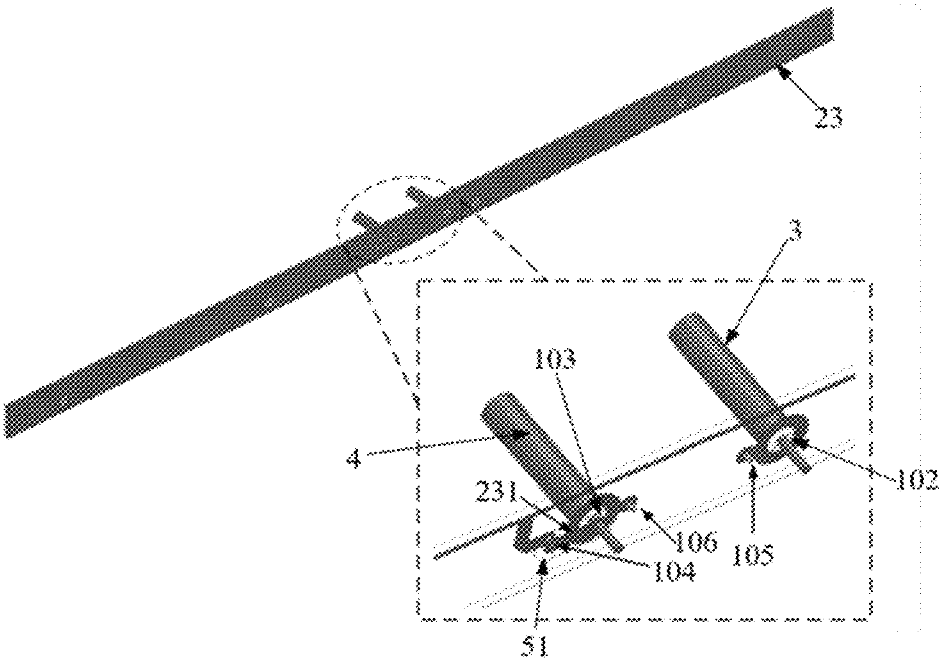
FIG. 4 is an enlarged diagram of a feed position on a second substrate of an antenna according to some embodiments of the present disclosure.
Figure 5:
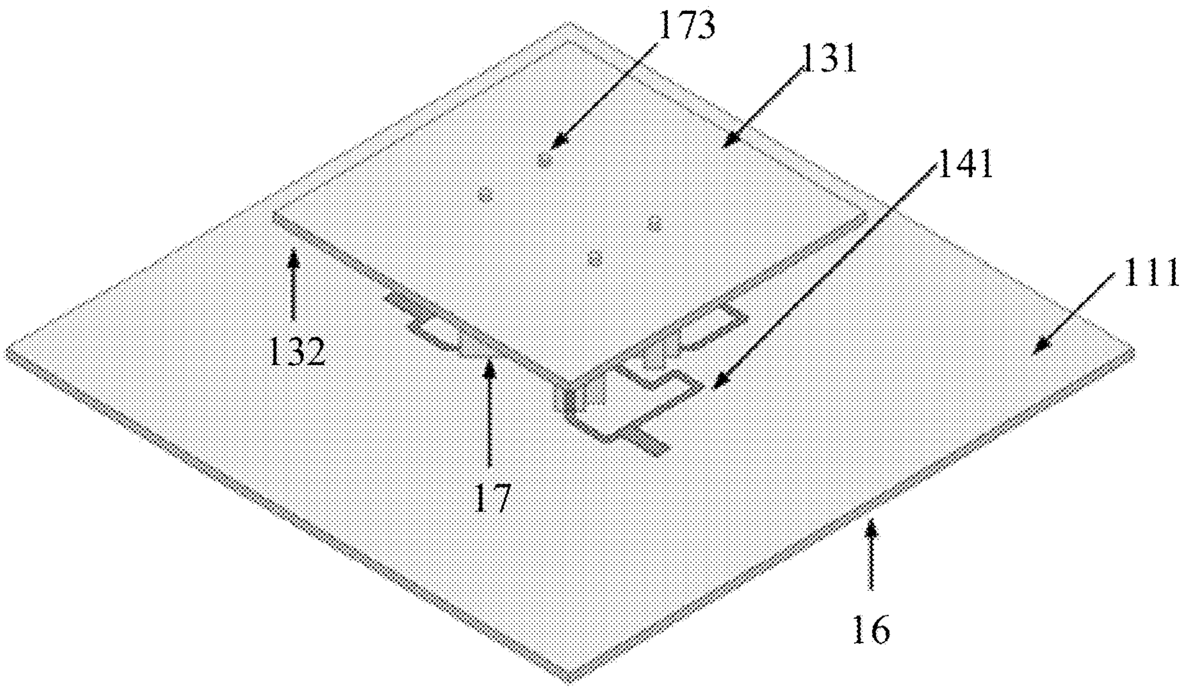
FIG. 5 is a full view of an oscillator of an antenna according to some embodiments of the present disclosure.
Figure 6:
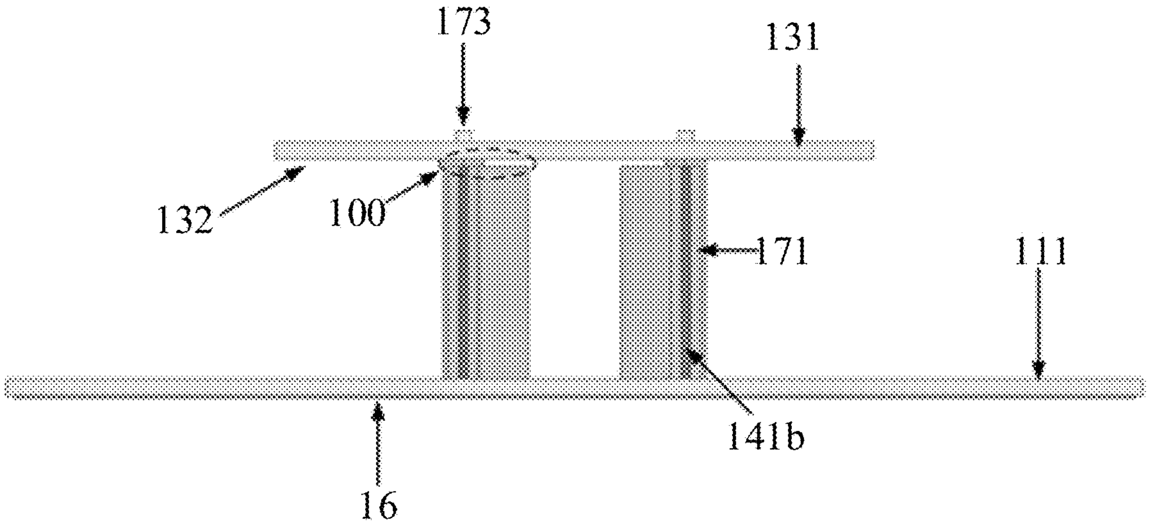
FIG. 6 is a side view of an oscillator of an antenna according to some embodiments of the present disclosure.
Figure 7:
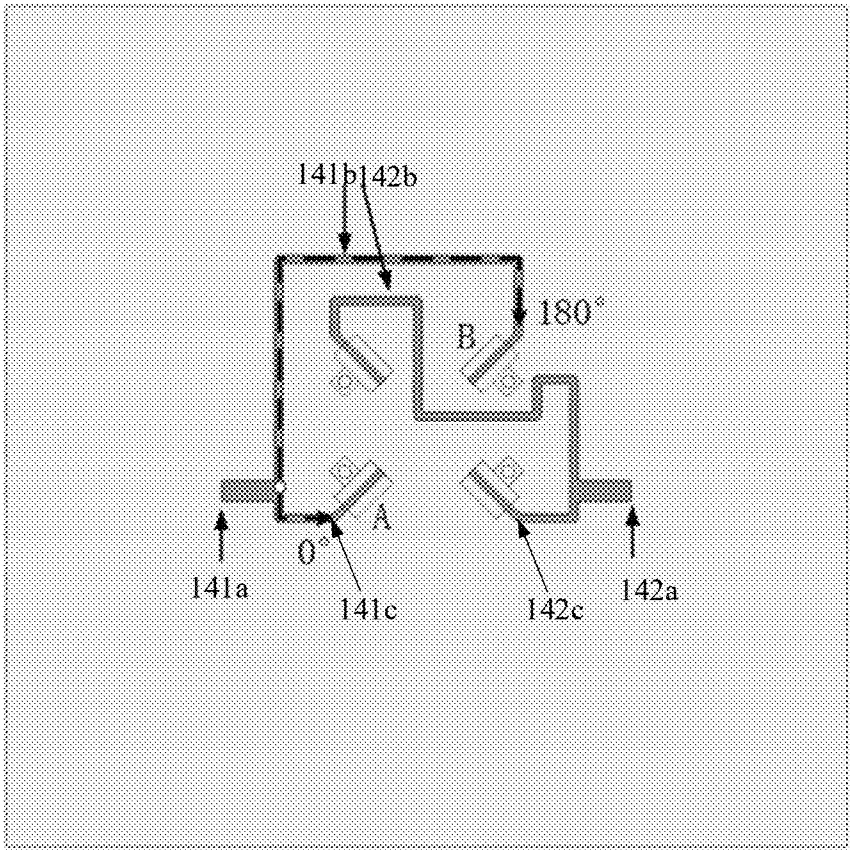
FIG. 7 is a top view of a first substrate of an oscillator of an antenna according to some embodiments of the present disclosure.

Specifically, as shown in FIG. 4, a first opening 51 is defined in the second reference electrode layer 23, and a first connection electrode 231 is disposed in the first opening 51. The line core of the first radiation frequency line 3 is electrically connected to a second feed port of the first feed structure 15 through a second connection via 102, and the second connection via 102 extends through the second dielectric substrate 21, the second reference electrode layer 23, the first reference electrode layer 16, and the side substrate 112. The line core of the second radiation frequency line 4 is electrically connected to the first connection electrode 231 through a third connection via 103, the first connection electrode 231 is electrically connected to a second feed port of the second feed structure 22 through a fourth connection via 104, and the third connection via 103 and the fourth connection via 104 extends through the second dielectric substrate 21. In addition, the antenna further includes a second opening 52, and the second opening 52 extends through the side substrate 112 and the first reference electrode layer 16, and the line core of the second radiation frequency line 4 extends through the second opening 52. That is, the second opening 52 is used as a line core escape of the second radiation frequency line 4.

Furthermore, as shown in FIG. 4, the antenna further includes a first pad and a second pad. The first pad is sleeved on the first radiation frequency line 3, is electrically connected to a reference position of the first radiation frequency line 3, and is electrically connected to the second reference electrode layer 23 through a fifth connection via 105. The second pad is sleeved on the second radiation frequency line 4, is electrically connected to a reference position of the second radiation frequency line 4, and is electrically connected to the second reference electrode layer 23 through a sixth connection via 106. The fifth connection via 105 and the sixth connection via 106 extend through the second dielectric substrate 21. The reference position of the first radiation frequency line 3 is electrically connected to the first pad, and the reference position of the second radiation frequency line 4 is electrically connected to the second pad, such that the signal line for supplying the voltage to the reference position of the first radiation frequency line 3 and the reference position of the second radiation frequency line 4 is not required, and the lines are reduced.

In some embodiments, the first feed structure 15 in the embodiments of the present disclosure is formed on the third surface M3 of the side substrate 112 by laser engraved chemical plating.

Figure 8:
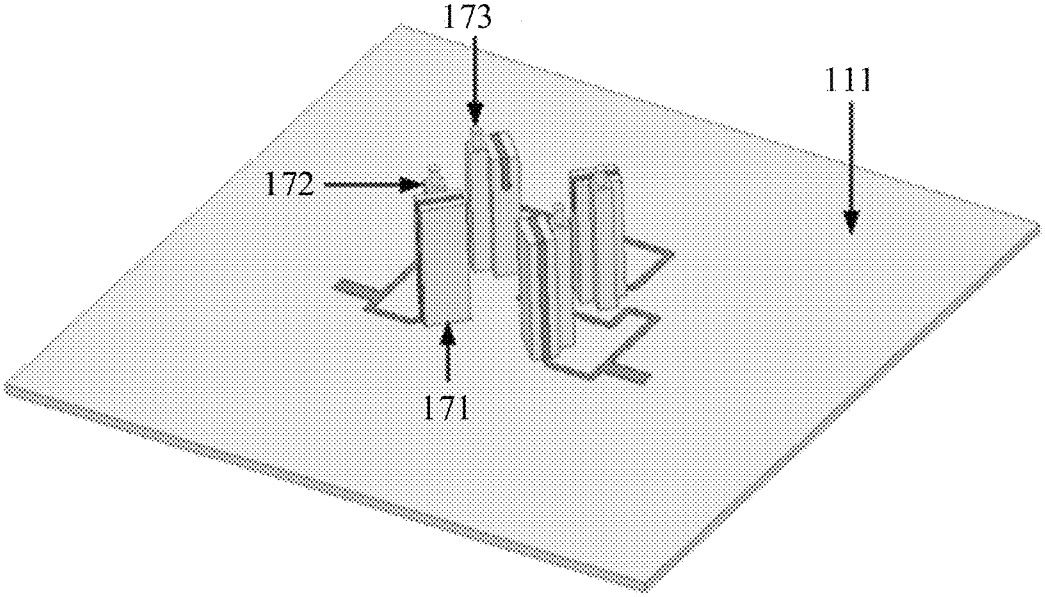
FIG. 8 is a schematic diagram of a support assembly of an oscillator of an antenna according to some embodiments of the present disclosure.

In some embodiments, as shown in FIG. 8, the support assembly 17 in the embodiments of the present disclosure includes a first support portion, a second support portion, a third support portion, and a fourth support portion that are disposed on the main substrate 111. A first laser engraved pattern is formed on the first support portion, a second laser engraved pattern is formed on the second support portion, a third laser engraved pattern is formed on the third support portion, and a fourth laser engraved pattern is formed on the fourth support portion. The first branch circuit 141*b* is formed on the first laser engraved pattern, the second branch circuit 141*c* is formed on the second laser engraving pattern, the third branch circuit 142*b* is formed on the third laser engraved pattern, and the fourth branch circuit 142*c* is formed on the fourth laser engraved pattern. That is, in the embodiments of the present disclosure, in forming the first branch circuit 141*b*, the second branch circuit 141*c*, the third branch circuit 142*b*, and the fourth branch circuit 142*c*, grooves of the first branch circuit 141*b*, the second branch circuit 141*c*, the third branch circuit 142*b*, and the fourth branch circuit 142*c* are first and respectively formed in the first support portion, the second support portion, the third support portion, and the fourth support portion by laser engraving, that is, the first laser engraved pattern, the second laser engraved pattern, the third laser engraved pattern, and the fourth laser engraved pattern are formed. Then conductive materials are formed in the first laser engraved pattern, the second laser engraved pattern, the third laser engraved pattern, and the fourth laser engraved pattern by a method including, but not limited to chemical plating, such that the first branch circuit 141*b*, the second branch circuit 141*c*, the third branch circuit 142*b*, and the fourth branch circuit 142*c* are formed.

Furthermore, in the embodiments of the present disclosure, the first support portion, the second support portion, the third support portion, and the fourth support portion are made of plastics, for detail, polycarbonate plastics or cycloolefin polymer plastics.

Furthermore, in the embodiments of the present disclosure, each of orthographic projections of the first support portion, the second support portion, the third support portion, and the fourth support portion on the main substrate 111 is T-shaped, and each of the first support portion, the second support portion, the third support portion, and the fourth support portion includes a first portion and a second portion that are disposed on the first dielectric substrate 11 and connected with each other. The first laser engraved pattern is formed on the first portion 171 of the first support portion, the second laser engraved pattern is formed on the first portion 171 of the second support portion, the third laser engraved pattern is formed on the first portion 171 of the third support portion, and the fourth laser engraved pattern is formed on the first portion 171 of the fourth support portion. In the structure, the first support portion, the second support portion, the third support portion, and the fourth support portion are of stiffener structures, and thus can secure the radiation structure 13 more stably.

Figure 9:
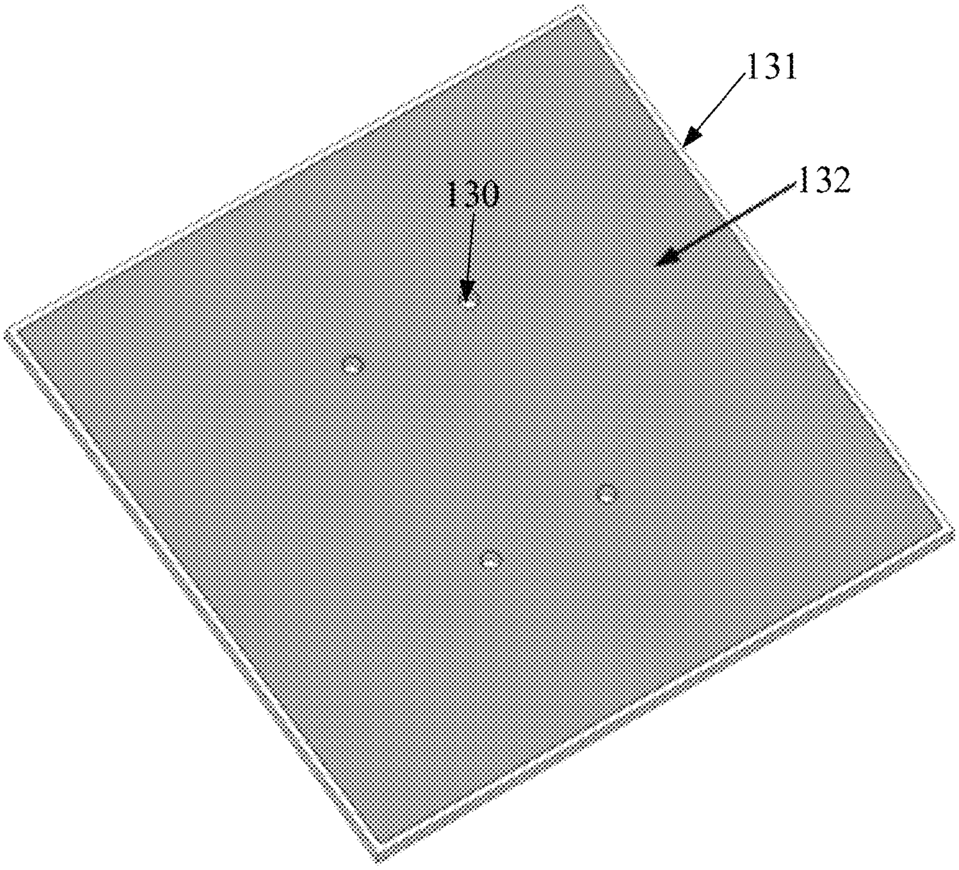
FIG. 9 is a top view of a radiation structure (at a radiation layer side) of an antenna according to some embodiments of the present disclosure.
Figure 10:
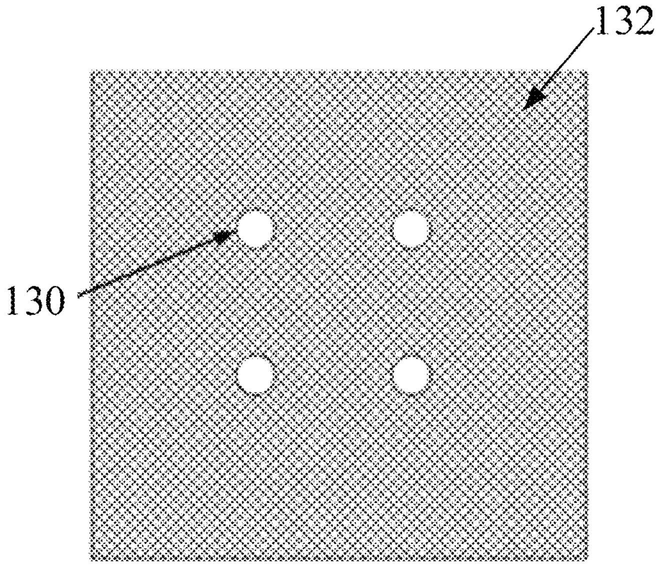
FIG. 10 is a top view of a radiation layer of an antenna according to some embodiments of the present disclosure.

Furthermore, as shown in FIG. 9, protrusion portions 173 are provided on sides, facing away from the first dielectric substrate 11, of the second portion 172 of the first support portion, the second portion 172 of the second support portion, the second portion 172 of the third support portion, and the second portion 172 of the fourth support portion, and the protrusion portions 173 extend through the radiation structure 13 and are secured to the radiation structure 13. That is, four securing holes 130 are defined in the radiation structure 13, and the protrusion portions on the second portion 172 of the first support portion, the second portion 172 of the second support portion, the second portion 172 of the third support portion, and the second portion 172 of the fourth support portion respectively pass through the corresponding securing holes 130, such that the radiation structure 13 is well secured to the support assembly 17.

In some embodiments, as shown in FIG. 8 and FIG. 9, the radiation structure 13 includes a third dielectric substrate 131 opposite to the main substrate 111 and a radiation layer 132 disposed on the third dielectric substrate 131. Specifically, the radiation layer 132 is disposed on a side, proximal to the main substrate 111, of the third dielectric substrate 131. It should be noted that gaps 100 are present between the radiation layer 132 and the first branch circuit 141*b* and the second branch circuit 141*c* of the first feeder 141, and the third branch circuit 142*b* and the fourth branch circuit 142*c* of the second feeder 142, such that the radiation layer 132 is electrically connected to the first branch circuit 141*b* and the second branch circuit 141*c* of the first feeder 141, and the third branch circuit 142*b* and the fourth branch circuit 142*c* of the second feeder 142 in a coupling mode.

Furthermore, the antenna in the embodiments of the present disclosure is a transparent antenna, and the radiation layer 132 is of a metal mesh structure. In some embodiments of the present disclosure, the second reference electrode layer 23, the first feeder 141, and the second feeder 142 are of metal mesh structures.

Figure 11:
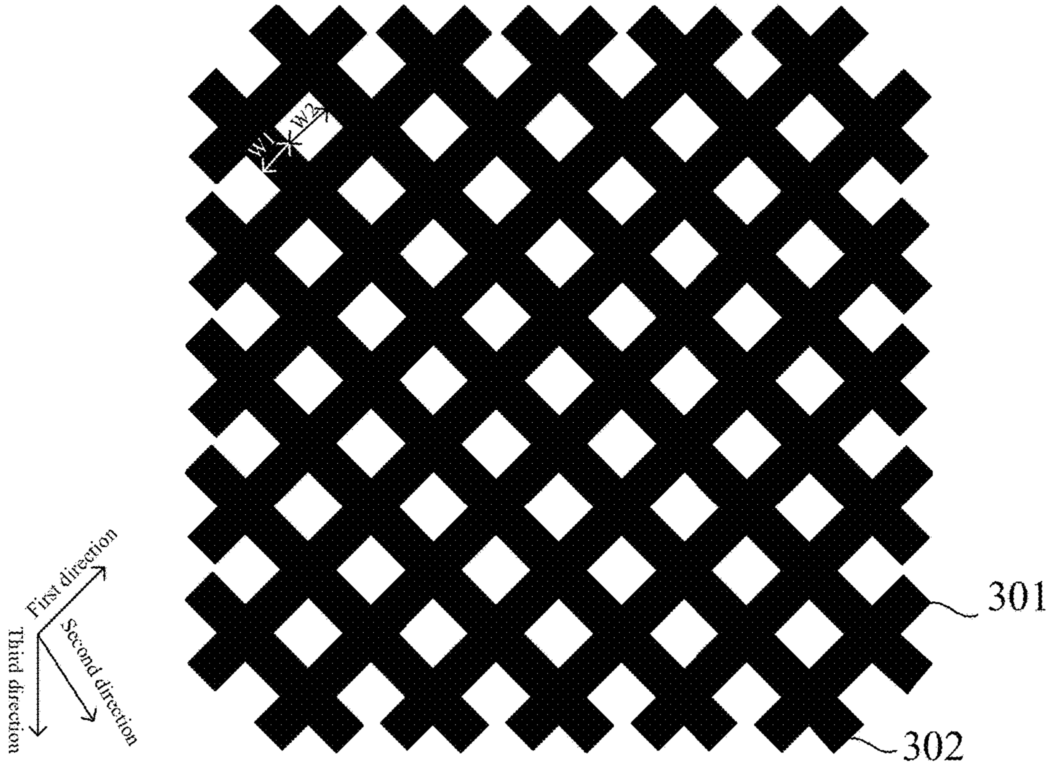
FIG. 11 is a top view of a metal mesh structure according to some embodiments of the present disclosure.

Furthermore, as shown in FIG. 11, in the embodiments of the present disclosure, the metal mesh structure includes a plurality of crossed first metal lines and a plurality of crossed second metal lines. The first metal lines are juxtaposed in a first direction and extend in a second direction. The second metal lines are juxtaposed in the first direction and extend in a third direction. An extension direction of the first metal lines of the metal mesh structure is perpendicular to an extension direction of the second metal lines of the metal mesh structure, and in this case, a square or rectangular hollowed-out portion is formed. In some embodiments, the extension direction of the first metal lines of the metal mesh structure is not perpendicular to an extension direction of the second metal lines. For example, an included angle between the extension direction of the first metal lines and the extension direction of the second metal lines is 45°, and in this case, a rhombic hollowed-out portion is formed.

In some embodiments, line widths, line thicknesses, and line spaces of the first metal line and the second metal line are the same, or different. For example, the line width W1 of the first metal line and the line width W1 of the second metal line range from 1 μm to 30 μm, the line space W2 of the first metal lines and the line space W2 of the second metal lines range from 50 μm to 250 μm, and the line thickness W3 of the first metal line and the line width W3 of the second metal line ranges from 0.5 μm to 10 μm. In the embodiments of the present disclosure, the metal mesh structure is formed on a flexible substrate by a method including, but not limited to the embossing or etching process, and then is attached to the first dielectric substrate 11/the third dielectric substrate 131.

In some embodiments, the first dielectric substrate 11 and the third dielectric substrate 131 are made of polycarbonate plastic (PC), cycloolefin polymer plastic (COP), or polymethyl methacrylate/organic glass (PMMA). In addition, the transparent optical adhesive is used to adhere the first flexible substrate and the second flexible substrate to the first dielectric substrate 11, and to adhere the third flexible substrate to the third dielectric substrate 131.

In some embodiments, the antenna not only includes the above structure, but also includes an antenna housing. The first substrate, the second substrate 2, and the third substrate are disposed in an accommodation space of the antenna housing. The first substrate and the third substrate are respectively disposed on an upper face and a lower face of the antenna housing, for example, the first substrate and the third substrate are respectively adhered to the upper face and the lower face of the antenna housing using an optically clear adhesive (OCA). Specifically, the antenna housing includes a first material and a second material that are opposite to each other, the first dielectric substrate 11 provided with the first reference electrode layer 16 is disposed on a side, proximal to the second substrate 2, of the first material, and the radiation structure 13 is disposed on a side, proximal to the first material, of the second material.

Furthermore, the antenna housing is made of a plastic, for example, PC, COP, or PMMA, or the like.

In some embodiments of the present disclosure, the above first connection via 101, the second connection via 102, the third connection via 103, the fourth connection via 104, the fifth connection via 105, and the sixth connection via 106 are conductive vias, and are filled with conductive members, such as copper needles.

In some embodiments, the antenna in the embodiments of the present disclosure is a transparent antenna, and is applicable to the glass window system including, but not limited to automobiles, trains (including the high-speed rail), aircraft, buildings, and the like. The transparent antenna is secured to on an inner side (a side proximal to the indoor environment) of the glass window. As a high optical transmittance of the transparent antenna, the transmittance of the glass window is not greatly affected in achieving the communication function, and the transparent antenna also becomes a trend of the beautifying antenna.

Figure 12:
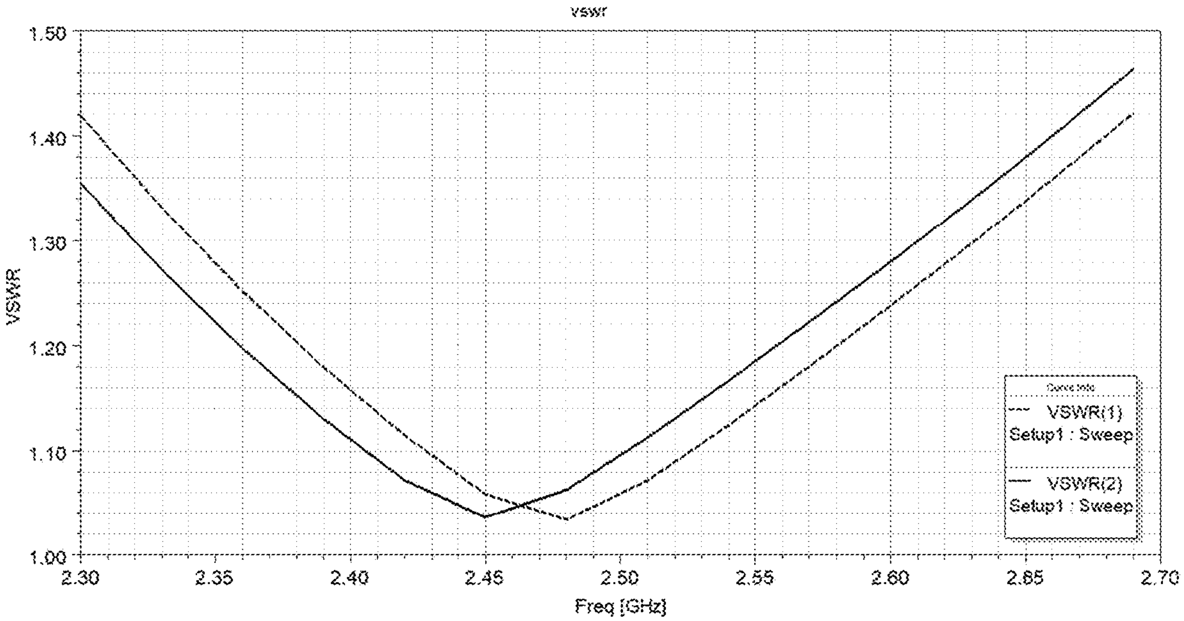
FIG. 12 is a schematic diagram of a standing wave ratio of an oscillator according to some embodiments of the present disclosure.
Figure 13:
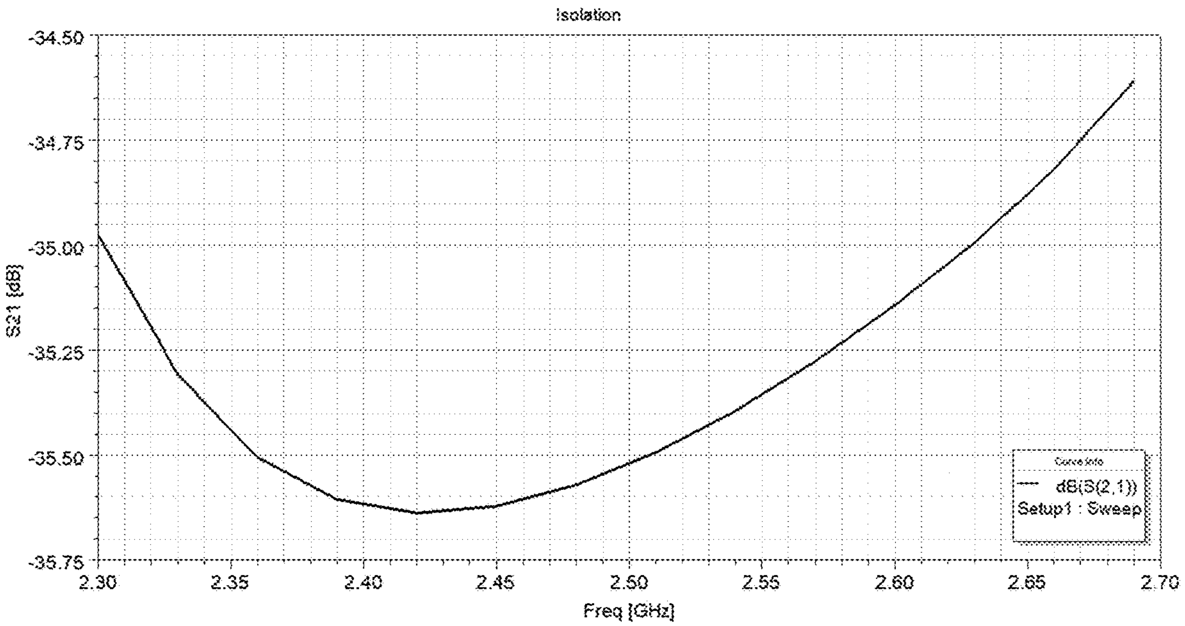
FIG. 13 is a schematic diagram of isolation of an oscillator according to some embodiments of the present disclosure.
Figure 14:
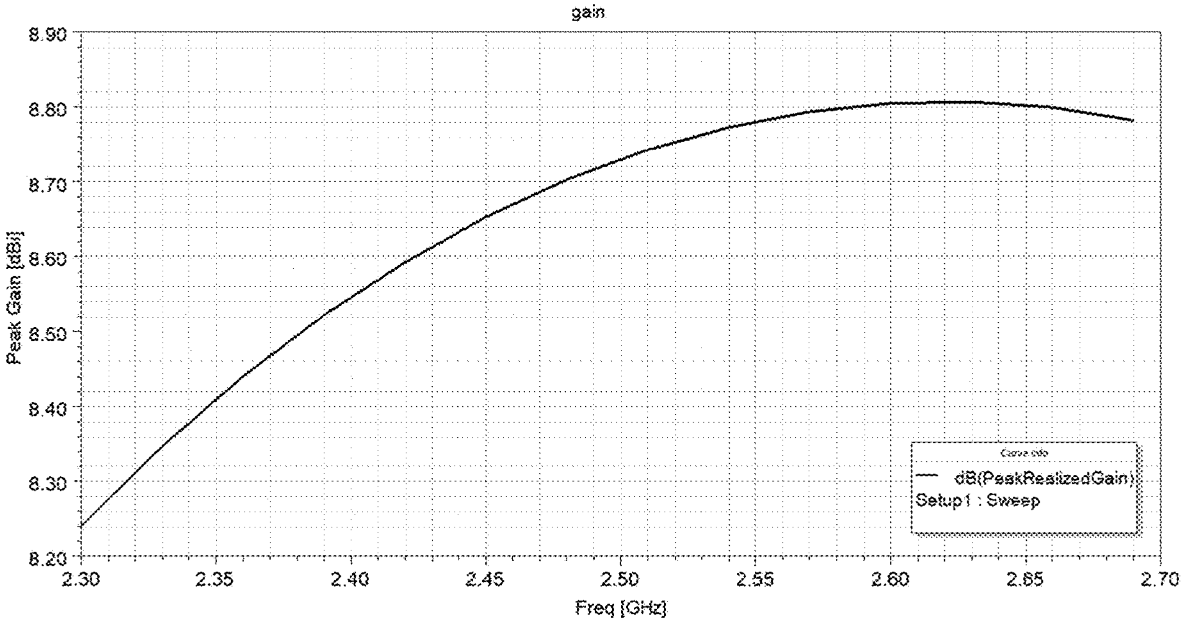
FIG. 14 is a schematic diagram of gain of an oscillator according to some embodiments of the present disclosure.

In the embodiments of the present disclosure, the oscillator is of a size of 80 mm*80 mm*18 mm (0.67 λc*0.67 λc*0.15 λc, λc represents a wavelength of a center frequency). The oscillator indicates the radiation structure and the first feeder 141 and the second feeder 142 that are connected to the radiation structure 13. FIG. 12 is a schematic diagram of a standing wave ratio of an oscillator according to some embodiments of the present disclosure. As shown in FIG. 12, the operating bandwidth of the oscillator in the embodiments of the present disclosure meets that VSWR<1.5 at a range of 2300-2700 MHZ, and a relative bandwidth is greater than 16%. FIG. 13 is a schematic diagram of isolation of an oscillator according to some embodiments of the present disclosure. As shown in FIG. 13, the oscillator in the embodiments of the present disclosure achieves ultra-high isolation of greater than 34.5 dB at the operating frequency of 2300-2700 MHZ, and the crosstalk resistance of the double-polarized oscillator is greatly improved. FIG. 14 is a schematic diagram of gain of an oscillator according to some embodiments of the present disclosure. As shown in FIG. 14, the oscillator in the embodiments of the present disclosure achieves radiation gain greater than 8.2 dBi within the operating frequency.

For clear understanding of the performances in the embodiments of the present disclosure, the antenna shown in FIG. 1 is simulated. The antenna is formed by a 1*4 oscillator array with a size of 320 mm*75 mm*18 mm (2.67 λc*0.625 λc*0.15 λc). The antenna includes a first substrate, a second substrate 2, a first radiation frequency line 3, and a second radiation frequency line 4. The first substrate includes a first dielectric substrate 11, a first reference electrode layer 16, four support assemblies 17, four radiation structures 13, and four feeder sets. In the embodiments of the present disclosure, the feeder sets and the support assemblies 17 are respectively in one-to-one correspondence to the radiation structures 13. The first dielectric substrate 11 in the first substrate is a L-shaped substrate, and includes a main substrate 111 and a side substrate 112. The main substrate 111 is provided with a first surface M1 and a second surface M2 that are opposite to each other in a thickness direction of the main substrate 111, and the side substrate 112 is provided with a third surface M3 and a fourth surface M4 that are opposite to each other in a thickness direction of the side substrate 112. The second surface M2 of the main substrate 111 is connected to the third surface M3 of the side substrate 112, and the side substrate 112 protrudes from the second surface M2 of the main substrate 111. The first reference electrode layer 16 is disposed on the first surface M1 of the main substrate 111 and the fourth surface M4 of the side substrate 112. The support assembly 17 is disposed on the second surface M2 of the main substrate 111. The radiation structure 13 is disposed on a side, facing away from the main substrate 111, of the support assembly 17. Each feeder set includes two feeders, that is, a first feeder 141 and a second feeder 142. The first feeder 141 and the second feeder 142 in the feeder set extend to the support assembly 17 through the second surface M2 and are electrically connected to the radiation structure 13. The first feeder 141 and the second feeder 142 are one-two power dividers. A phase difference between the first branch circuit 141*b* and the second branch circuit 141*c* in the first feeder 141 is 180°, and a phase difference between the third branch circuit 142*b* and the fourth branch circuit 142*c* in the second feeder 142 is 180°. The first feed structure 15 is integrated in the first substrate, and the second feed structure 22 is integrated in the second substrate 2. The first feed structure 15 and the second feed structure 22 are one-four power dividers. A line core of the first radiation frequency line 3 is electrically connected to the second feed port of the first feed structure 15, and a line core of the second radiation frequency line 4 is electrically connected to the second feed port of the second feed structure 22. The first pad is sleeved on the first radiation frequency line 3, is electrically connected to a reference position of the first radiation frequency line 3, and is electrically connected to the second reference electrode layer 23 through a fifth connection via 105. The second pad is sleeved on the second radiation frequency line 4, is electrically connected to a reference position of the second radiation frequency line 4, and is electrically connected to the second reference electrode layer 23 through a sixth connection via 106. The fifth connection via 105 and the sixth connection via 106 extend through the second dielectric substrate 21.

Figure 15:
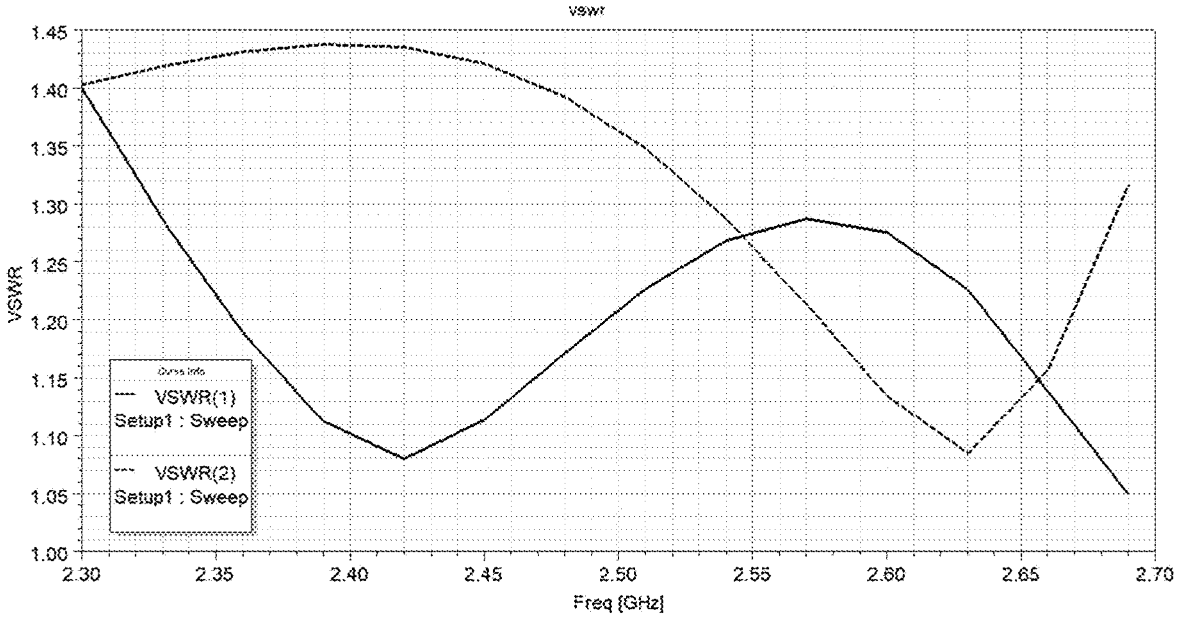
FIG. 15 is a schematic diagram of a standing wave ratio of an antenna according to some embodiments of the present disclosure.
Figure 16:
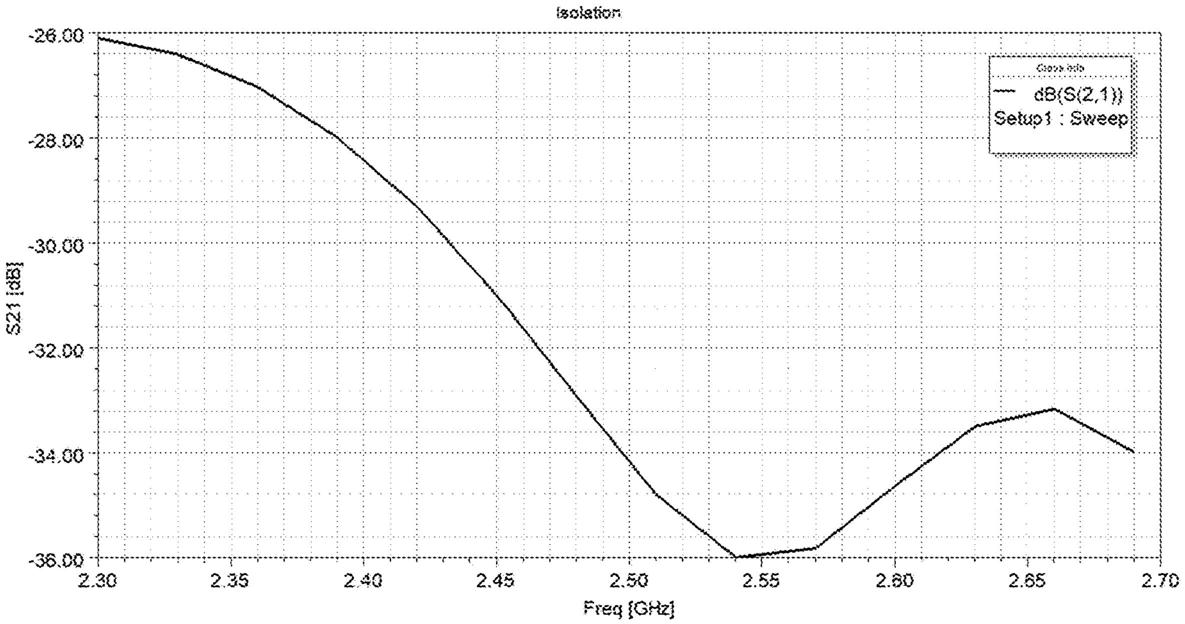
FIG. 16 is a schematic diagram of isolation of an antenna according to some embodiments of the present disclosure.
Figure 17:
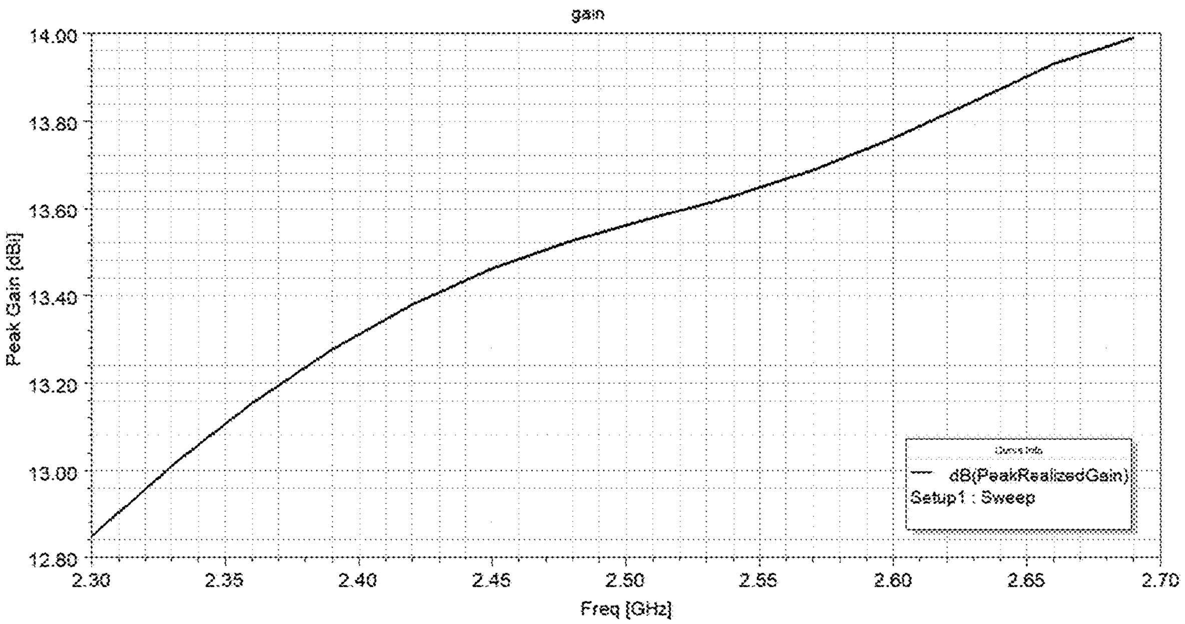
FIG. 17 is a schematic diagram of gain of an antenna according to some embodiments of the present disclosure.

FIG. 15 is a schematic diagram of a standing wave ratio of an oscillator according to some embodiments of the present disclosure. As shown in FIG. 15, the antenna in the embodiments of the present disclosure reaches the operating frequency of 2300-2700 MHZ upon forming an array with oscillators with the wide frequency. FIG. 16 is a schematic diagram of isolation of an oscillator according to some embodiments of the present disclosure. As shown in FIG. 16, the antenna in the embodiments of the present disclosure achieves high isolation of greater than 26 dB at the operating frequency range. FIG. 17 is a schematic diagram of gain of an oscillator according to some embodiments of the present disclosure. As shown in FIG. 17, the antenna in the embodiments of the present disclosure achieves excellent gain greater than 12.8 dBi within the operating frequency to ensure the intensity of the signal in the signal coverage of the antenna in the embodiments of the present disclosure.

In a second aspect, the embodiments of the present disclosure further provide an electronic device. The electronic device includes the antenna according to any of the above embodiments.

In some embodiments, the antenna in the electronic device further includes a transceiver unit, a radio frequency transceiver, a signal amplifier, a power amplifier, and a filter unit. The antenna in the communication device is a sending antenna or a receiving antenna. The transceiver unit includes a base band and a receiving end. The base band provides at least one frequency band signal, such as the 2G signal, the 3G signal, the 4G signal, the 5G signal, and the like, and sends at least one frequency band signal to the radio frequency transceiver. Upon receiving the signal, the antenna in the communication system transmits the signal to the receiving end of the transceiver unit upon processing by the filter unit, the power amplifier, the signal amplifier, and the radio frequency transceiver, and the receiving end is a smart gateway.

Furthermore, the radio frequency transceiver is connected to the transceiver unit for modulating the signal sent by the transceiver unit or demodulating the signal received by the antenna and transmitting the signal back to the transceiver unit. Specifically, the radio frequency transceiver includes a transmitting circuit, a receiving circuit, a modulation circuit, and a demodulation circuit. After the transmitting circuit receives various types of signals provided by the baseband, the modulation circuit modulates various types of signals provided by the baseband and then sends to the antenna. The antenna receives the signal and transmits to the receiving circuit of the radio frequency transceiver, the receiving circuit transmits the signal to the demodulation circuit, and the demodulation circuit demodulates the signal and then transmits to the receiving end.

Furthermore, the radio frequency transceiver is connected to the signal amplifier and the power amplifier, and the signal amplifier and the power amplifier are connected to the filter unit, and the filter unit is connected to at least one antenna. In sending signals by the communication system, the signal amplifier is used to improve the signal-to-noise ratio of the signals output by the radio frequency transceiver and then transmit to the filter unit. The power amplifier is used to amplify the power of the signal output by the radio frequency transceiver and then transmit to the filter unit. The filter unit specifically includes a duplexer and a filter circuit. The filter unit combines the signals output by the signal amplifier and the power amplifier, filters the noise wave and transmits to the antenna, and the antenna radiates the signal. In receiving signals by the communication system, the antenna transmits the signals to the filter unit upon receiving the signals, and the filter unit filters the noise wave from the signals received by the antenna and transmits to the signal amplifier and the power amplifier, and the signal amplifier gains the signals received by the antenna to increase the signal-to-noise ratio of the signals. The power amplifier amplifies the power of the signal received by the antenna. The signal received by the antenna is processed by the power amplifier and signal amplifier and transmits to the radio frequency transceiver, and the radio frequency transceiver then transmits to the transceiver unit.

In some embodiments, the signal amplifier includes various types of signal amplifiers, such as a low noise amplifier, which is not limited herein.

In some embodiments, the antenna in the embodiments of the present disclosure further includes a power management unit, and the power management unit is connected to the power amplifier to provide the voltage with amplified signal for the power amplifier.

It can be understood that the above embodiments are exemplary embodiments for illustrating the principles of the present disclosure, and should not be construed as limiting the present disclosure. A person of ordinary skill in the art can obtain variations and improvements without departing from the spirit or essence of the present disclosure, the variations and improvements are within the scope of the protection of the present disclosure.

The invention claimed is:

1. An antenna, comprising: a first substrate, wherein the first substrate comprises:

a first dielectric substrate, comprising a main substrate and a side substrate, wherein the main substrate is provided with a first surface and a second surface that are opposite to each other in a thickness direction of the main substrate, and the side substrate is provided with a third surface and a fourth surface that are opposite to each other in a thickness direction of the side substrate, the second surface of the main substrate being connected to the third surface of the side substrate, and the side substrate protruding from the second surface of the main substrate;

a first reference electrode layer, disposed on the first surface and the fourth surface;

at least one support assembly, disposed on the second surface;

at least one radiation structure, disposed on a side, facing away from the main substrate, of the support assembly; and at least one first feeder set, configured to feed one of the at least one radiation structure, wherein each of the at least one first feeder set comprises a first feeder and a second feeder, wherein the first feeder and the second feeder extend to the at least one support assembly through the second surface and are electrically connected to the at least one radiation structure, and polarization directions of the first feeder and the second feeder are different, wherein the first substrate further comprises:

a first feed structure, disposed on the third surface, wherein a first feed port of the first feed structure is electrically connected to the first feeder; and the antenna further comprises a second substrate, wherein the second substrate comprises:

a second dielectric substrate, provided with a fifth surface and a sixth surface that are opposite to each other in a thickness direction of the second dielectric substrate, wherein the fifth surface and the fourth surface are oppositely disposed;

a second reference electrode layer, disposed on the fifth surface; and a second feed structure, disposed on the sixth surface, wherein a first feed port of the second feed structure is electrically connected to the second feeder through a first connection via, wherein the first connection via extends through the side substrate, the first reference electrode layer, the second reference electrode layer, and the second dielectric substrate.

2. The antenna according to claim 1, wherein a first opening is defined in the second reference electrode layer, wherein a first connection electrode is disposed in the first opening; and the antenna further comprises a first radiation frequency line and a second radiation frequency line; wherein a line core of the first radiation frequency line is electrically connected to a second feed port of the first feed structure through a second connection via, wherein the second connection via extends through the second dielectric substrate, the second reference electrode layer, the first reference electrode layer, and the side substrate; and a line core of the second radiation frequency line is electrically connected to the first connection electrode through a third connection via, wherein the first connection electrode is electrically connected to a second feed port of the second feed structure through a fourth connection via, the third connection via and the fourth connection via extending through the second dielectric substrate.

3. The antenna according to claim 2, further comprising: a second opening, wherein the second opening extends through the side substrate and the first reference electrode layer, and the line core of the second radiation frequency line extends through the second opening.

4. The antenna according to claim 2, further comprising: a first pad and a second pad, wherein the first pad is sleeved on the first radiation frequency line, is electrically connected to a reference position of the first radiation frequency line, and is electrically connected to the second reference electrode layer through a fifth connection via; and the second pad is sleeved on the second radiation frequency line, is electrically connected to a reference position of the second radiation frequency line, and is electrically connected to the second reference electrode layer through a sixth connection via, the fifth connection via and the sixth connection via extending through the second dielectric substrate.

5. The antenna according to claim 1, wherein the second dielectric substrate is a printed circuit board.

6. The antenna according to claim 1, wherein the first feeder comprises a first main circuit, a first branch circuit, and a second branch circuit, and the second feeder comprises a second main circuit, a third branch circuit, and a fourth branch circuit; wherein for the first feeder, one end of the first main circuit is electrically connected to a first feed port of the first feed structure, the other end of the first main circuit is electrically connected to the first branch circuit and the second branch circuit, and the first branch circuit and the second branch circuit are electrically connected to one of the at least one radiation structure; and for the second feeder, one end of the second main circuit is electrically connected to a first feed port of the second feed structure, the other end of the second main circuit is electrically connected to the third branch circuit and the fourth branch circuit, and the third branch circuit and the fourth branch circuit are electrically connected to one of the at least one radiation structure.

7. The antenna according to claim 6, wherein each of the at least one support assembly comprises a first support portion, a second support portion, a third support portion, and a fourth support portion that are disposed on the main substrate; wherein a first laser engraved pattern is formed on the first support portion, a second laser engraved pattern is formed on the second support portion, a third laser engraved pattern is formed on the third support portion, and a fourth laser engraved pattern is formed on the fourth support portion; wherein the first branch circuit is formed on the first laser engraved pattern, the second branch circuit is formed on the second laser engraved pattern, the third branch circuit is formed on the third laser engraved pattern, and the fourth branch circuit is formed on the fourth laser engraved pattern.

8. The antenna according to claim 7, wherein the first support portion, the second support portion, the third support portion, and the fourth support portion are all made of polycarbonate plastics or cycloolefin polymer plastics.

9. The antenna according to claim 7, wherein each of orthographic projections of the first support portion, the second support portion, the third support portion, and the fourth support portion on the main substrate is T-shaped, and each of the first support portion, the second support portion, the third support portion, and the fourth support portion comprises a first portion and a second portions that are disposed on the main substrate and connected with each other, wherein the first laser engraved pattern is formed on the first portion of the first support portion, the second laser engraved pattern is formed on the first portion of the second support portion, the third laser engraved pattern is formed on the first portion of the third support portion, and the fourth laser engraved pattern is formed on the first portion of the fourth support portion.

10. The antenna according to claim 9, wherein protrusion portions are provided on sides, facing away from the first dielectric substrate, of the second portion of the first support portion, the second portion of the second support portion, the second portion of the third support portion, and the second portion of the fourth support portion, wherein the protrusion portions extend through the at least one radiation structure and are secured to the at least one radiation structure.

11. The antenna according to claim 1, wherein each of the at least one radiation structure comprises a third dielectric substrate opposite to the main substrate and a radiation layer disposed on the third dielectric substrate.

12. The antenna according to claim 11, wherein the radiation layer is disposed on a side, proximal to the main substrate, of the third dielectric substrate.

13. The antenna according to claim 11, wherein the radiation layer is of a metal mesh structure.

14. The antenna according to claim 13, wherein a line width of the metal mesh structure ranges from 2 μm to 30 μm, a line space of the metal mesh structure ranges from 50 μm to 250 μm, and a line thickness of the metal mesh structure ranges from 1 μm to 10 μm.

15. The antenna according to claim 11, wherein the third dielectric substrate is made of any of polycarbonate plastic, cycloolefin polymer plastic, and organic glass.

16. The antenna according to claim 1, further comprising: an antenna housing, wherein the first substrate is disposed in the antenna housing.

17. The antenna according to claim 1, wherein the first dielectric substrate is made of any of polycarbonate plastic, cycloolefin polymer plastic, and organic glass.

18. The antenna according to claim 1, wherein the main substrate and the side substrate are of an integrated structure.

19. An electronic device, comprising: an antenna, wherein the antenna comprises: a first substrate, wherein the first substrate comprises:

a first dielectric substrate, comprising a main substrate and a side substrate, wherein the main substrate is provided with a first surface and a second surface that are opposite to each other in a thickness direction of the main substrate, and the side substrate is provided with a third surface and a fourth surface that are opposite to each other in a thickness direction of the side substrate, the second surface of the main substrate being connected to the third surface of the side substrate, and the side substrate protruding from the second surface of the main substrate;

a first reference electrode layer, disposed on the first surface and the fourth surface;

at least one support assembly, disposed on the second surface;

at least one radiation structure, disposed on a side, facing away from the main substrate, of the support assembly; and at least one first feeder set, configured to feed one of the at least one radiation structure, wherein each of the at least one first feeder set comprises a first feeder and a second feeder, wherein the first feeder and the second feeder extend to the at least one support assembly through the second surface and are electrically connected to the at least one radiation structure, and polarization directions of the first feeder and the second feeder are different, wherein the first substrate further comprises:

a first feed structure, disposed on the third surface, wherein a first feed port of the first feed structure is electrically connected to the first feeder; and the antenna further comprises a second substrate, wherein the second substrate comprises:

a second dielectric substrate, provided with a fifth surface and a sixth surface that are opposite to each other in a thickness direction of the second dielectric substrate, wherein the fifth surface and the fourth surface are oppositely disposed;

a second reference electrode layer, disposed on the fifth surface; and a second feed structure, disposed on the sixth surface, wherein a first feed port of the second feed structure is electrically connected to the second feeder through a first connection via, wherein the first connection via extends through the side substrate, the first reference electrode layer, the second reference electrode layer, and the second dielectric substrate.

* * * * *